US010841426B2

(12) United States Patent
Barnett et al.

(10) Patent No.: US 10,841,426 B2
(45) Date of Patent: *Nov. 17, 2020

(54) INTERACTION MANAGEMENT SYSTEM AND METHODS OF USE

(71) Applicant: Genesys Telecommunications Laboratories, Inc., Daly City, CA (US)

(72) Inventors: James Harmon Barnett, Auburndale, MA (US); Mark Scott, Kirkland, WA (US)

(*) Notice: Subject to any disclaimer, the term of this patent is extended or adjusted under 35 U.S.C. 154(b) by 434 days.

This patent is subject to a terminal disclaimer.

(21) Appl. No.: 15/397,580

(22) Filed: Jan. 3, 2017

(65) Prior Publication Data

US 2017/0118342 A1   Apr. 27, 2017

Related U.S. Application Data

(63) Continuation of application No. 12/695,382, filed on Jan. 28, 2010, now Pat. No. 9,537,924.

(51) Int. Cl.
*H04M 3/51* (2006.01)
*G06F 3/0484* (2013.01)
(Continued)

(52) U.S. Cl.
CPC .......... *H04M 3/5191* (2013.01); *G06F 3/048* (2013.01); *G06F 3/0481* (2013.01); *G06F 3/0484* (2013.01); *G06F 3/04842* (2013.01); *H04L 67/02* (2013.01); *H04L 67/10* (2013.01); *H04M 3/5175* (2013.01); *H04M 3/523* (2013.01);
(Continued)

(58) Field of Classification Search
CPC .. H04M 3/5191; H04M 3/5232; H04M 7/003; H04M 3/5175; H04M 3/523; H04M 7/0036; H04M 2201/38; H04M 2203/252; H04M 2203/2011; G06Q 10/08; G06Q 10/10; G06F 3/04842; G06F 3/048;
(Continued)

(56) References Cited

U.S. PATENT DOCUMENTS 5,999,965 A    12/1999  Kelly
6,212,178 B1*  4/2001  Beck ...................... G06Q 10/06
                                                       370/352
(Continued)

FOREIGN PATENT DOCUMENTS

WO           0184415 A1    11/2001

OTHER PUBLICATIONS

European Search Report and Written Opinion dated Feb. 12, 2014 for corresponding EP Application No. 11702736.7, 7 pages.
(Continued)

*Primary Examiner* — Tuyetlien T Tran

(57) ABSTRACT

A communication transaction management system has a computerized appliance executing software from a digital medium for a particular enterprise, a holding function of the software tracking received transactions initiated by associated persons, and selecting individual transactions for connection to live agents, and a monitoring function for determining behavior of the persons associated with individual transactions on hold relative to an interactive presentation. Individual transactions on hold are prioritized for connection to live agents at least in part depending on the behavior determined by the monitoring function.

18 Claims, 3 Drawing Sheets

(51) Int. Cl.
  *G06F 3/048*   (2013.01)
  *H04L 29/08*   (2006.01)
  *G06F 3/0481*  (2013.01)
  *H04M 3/523*   (2006.01)
  *H04M 7/00*    (2006.01)
  *G06Q 10/08*       (2012.01)
  *G06Q 10/10*       (2012.01)

(52) U.S. Cl.
  CPC ......... *H04M 3/5232* (2013.01); *H04M 7/003* (2013.01); *H04M 7/0036* (2013.01); *G06Q 10/08* (2013.01); *G06Q 10/10* (2013.01); *H04M 2201/38* (2013.01); *H04M 2203/2011* (2013.01); *H04M 2203/252* (2013.01)

(58) Field of Classification Search
  CPC ..... G06F 3/0484; G06F 3/0481; H04L 67/10; H04L 67/02
  See application file for complete search history.

(56) References Cited

U.S. PATENT DOCUMENTS

| | | | |
|---|---|---|---|
| 6,332,154 B2 | 12/2001 | Beck et al. | |
| 6,519,335 B1 | 2/2003 | Bushnell | |
| 6,978,003 B1 | 12/2005 | Sylvain | |
| 7,353,182 B1 | 4/2008 | Missinhoun et al. | |
| 7,536,002 B1 | 5/2009 | Ma et al. | |
| 7,564,962 B1 | 7/2009 | O'Keeffe et al. | |
| 7,620,722 B1 | 11/2009 | Ruparel | |
| 7,684,556 B1 * | 3/2010 | Jaiswal | H04M 3/5166 379/266.01 |
| 8,401,156 B1 | 3/2013 | Milro et al. | |
| 2002/0077091 A1 | 6/2002 | Immonen et al. | |
| 2002/0141561 A1 | 10/2002 | Duncan et al. | |
| 2002/0191775 A1 * | 12/2002 | Boies | H04M 3/4285 379/266.01 |
| 2003/0031309 A1 | 2/2003 | Rupe et al. | |
| 2003/0103619 A1 | 6/2003 | Brown et al. | |
| 2003/0108185 A1 | 6/2003 | Brown et al. | |
| 2003/0167334 A1 * | 9/2003 | Butler | H04L 29/06 709/227 |
| 2004/0081183 A1 | 4/2004 | Monza et al. | |
| 2004/0165715 A1 | 8/2004 | Scott et al. | |
| 2005/0021599 A1 | 1/2005 | Peters | |
| 2005/0075894 A1 | 4/2005 | Bushey et al. | |
| 2006/0277273 A1 | 12/2006 | Hawkins | |
| 2008/0084975 A1 | 4/2008 | Schwartz | |
| 2008/0177600 A1 | 7/2008 | McCarthy et al. | |
| 2009/0232357 A1 | 9/2009 | Angell et al. | |
| 2010/0278318 A1 * | 11/2010 | Flockhart | G10L 17/26 379/88.04 |
| 2011/0038476 A1 | 2/2011 | Anisimov et al. | |
| 2011/0051918 A1 * | 3/2011 | Fan | H04M 3/5166 379/211.02 |
| 2011/0185293 A1 | 7/2011 | Barnett et al. | |

OTHER PUBLICATIONS

International Search Report and Written Opinion for PCT/US2011/021364, dated Sep. 9, 2011, 8 pages.

European Patent Office action for Application No. 11 702 736.7, dated Sep. 14, 2017, 6 pages.

* cited by examiner

INTERACTION MANAGEMENT SYSTEM AND METHODS OF USE

CROSS-REFERENCE TO RELATED APPLICATIONS

This application is a continuation of U.S. patent application Ser. No. 12/695,382, filed on Jan. 28, 2010, now U.S. Pat. No. 9,537,924, the disclosure of which is incorporated herein by reference in its entirety.

BACKGROUND OF THE INVENTION

1. Field of the Invention

The present invention is in the field of telephony including Internet Protocol network telephony (IPNT) and pertains particularly to methods and apparatus for managing interactions in a queuing system.

2. Discussion of the State of the Art

In the art of telephony, enterprise communications centers are now processing more and more digital communications. With the advent of the Internet network and Voice over Internet Protocol (VoIP), communications centers are processing more and more voice interactions coming in from wide area networks, such as the Internet. In many cases, callers have both an active connection open to a Website of the enterprise and a voice telephony connection, or interactive chat connection to an agent of the enterprise.

In most telephony applications a queue is used when there are no available agents to handle calls, and the customer's request for conversing with an agent must be placed in queue until an agent becomes available to take the call. Many queuing systems are first-in-first-out (FIFO) queues that have an estimated wait time parameter (EWT). EWT is the estimated amount of time that the caller just placed in queue will have to wait before they can expect the call to be connected to an agent. Live assistance is typically voice assistance but may also include realtime text-based interaction like one-on-one chat, email or text messaging.

In some telephony applications, a queuing system can have some priority order with respect to the interactions queued therein. For example, a very important person (VIP) may be queued ahead of a potential customer already in queue with no history of interaction with the enterprise. Priority-based queues are typically based on information that is pre-known about the calling party of the queued interaction.

When EWT is high in a queuing system, potential customers begin dropping out of queue, pushing up the call abandonment rate. Some enterprises offer a customer call-back option that may be presented by interactive voice response (IVR) either before en-queuing the customer for assistance or after the customer is already in queue for assistance. However, many potential customers are not available for the scheduled call-back or have found another solution by then.

It is desirable that potential customers do not become bored or uncomfortable waiting for live assistance. Audio content such as background music (music-on-hold) is typically presented to customers waiting for live assistance. Periodic reporting of EWT may also be a feature of the queuing system, as well as periodic call-back offers. However, despite current ways to engage and communicate with potential customers while they are waiting for live assistance, many still drop out of queue when wait times are high, resulting in lost potential business for the enterprise. Others may be in the wrong queue and are not redirected into a proper queue until a live agent has picked up the call.

Therefore, what is clearly needed is a system and methods for presenting potential customers with interactive Web content while they are in queue to keep them engaged and to potentially provide opportunity through active tracking of interaction with the presented content for advancement in queue or placement in a more relevant queue.

SUMMARY OF THE INVENTION

The problem stated above is that it is desirable that call-in-center call abandonment rates be lowered, but many of the means for lowering such rates such as periodic IVR prompting of potential customers to accept calls at a later time, also cause missed opportunities resulting from the time between the prompting and the actual call-back attempt.

The inventors therefore considered functional components of a call center system, looking for elements that exhibit interoperability that could potentially be harnessed to provide robust customer engagement while in queue, but in a manner that would not result in higher abandonment rates or missed call opportunities.

Every call-in center relies on an influx of call-in customers, one by-product of which is an abundance of customers that must wait in queue for assistance and a large percentage that drops out of the system before help arrives. Most such call-in-centers employ queuing systems when agents are not readily available to rout pending interaction requests to so they may be handled, and queuing systems are typically part of such apparatus.

The present inventor realized in an inventive moment that if, at the point of being queued for assistance, potential customers could be presented with a Web Interactive that could be monitored during interaction therewith, significant reduction in call abandonment rates might occur. The inventor therefore constructed a unique interaction management system for queuing up calls for live assistance arriving at the center from a Web site that allowed the enterprise to serve a Web interactive to queued customers whereby those customers might interact to advance position in queue or to be redirected to another queue. A significant reduction in call abandonment rate occurs with no impediment to interaction processing efficiency rate created.

Accordingly, in one embodiment of the present invention, a communication transaction management system is provided, comprising a computerized appliance executing software from a digital medium for a particular enterprise, a holding function of the software tracking received transactions initiated by associated persons, and selecting individual transactions for connection to live agents, and a monitoring function for determining behavior of the persons associated with individual transactions on hold relative to an interactive presentation. Individual transactions on hold are prioritized for connection to live agents at least in part depending on the behavior determined by the monitoring function.

In one embodiment the interactive presentation is a web page, and the behavior of the person involves the person's interaction with the web page. Also in one embodiment the holding function comprises a queue, and transactions are advanced or retarded in queue based at least in part depending on the behavior determined by the monitoring function.

In one embodiment the system further comprises a function determining if a person associated with a transaction on hold has initiated the transaction using a multi-modal device that also has web-browsing ability. Also in an embodiment the received transaction on hold was initiated from a web page hosted by the enterprise. IN that instance the act of initiating a transaction from the web page initiates linking to the interactive presentation.

In some embodiments there is a function wherein persons associated with transactions on hold are queried as to having web access, and if web access is available, are directed to the interactive presentation. In some cases the interactive presentation may be a survey form comprising a mechanism for the person to respond to questions.

In some embodiments the interactive presentation comprises interactive ability for a person to order a product or service. In such embodiments accomplishing an order for a product or service by the person associated with a transaction on hold may advance the transaction for connection to a live agent, and being in process of ordering a process or service may prevent connection to an agent until the ordering process is complete.

In another aspect of the invention a method for communication transaction management is provided, comprising the steps of (a) receiving transaction requests from persons; (b) placing the transactions on hold for connection to a live agent through executing software from a machine-readable medium by a computerized appliance; (c) monitoring behavior of persons associated with transactions on hold relative to an interactive presentation; and (d) prioritizing transactions for connection at least in part depending on the behavior determined in step (c).

BRIEF DESCRIPTION OF THE DRAWING FIGURES

DETAILED DESCRIPTION

The inventors provide a unique interaction management system especially for callers that call the enterprise after or during a web browsing session. In this instance the caller may be enabled to interact with a special Web interactive while waiting in queue for live assistance, and analyzed results of interactions with the Web interactive may justify a change in queue position for a caller or a change in queues altogether. The present invention is described in enabling detail below using the following examples, which may represent more than one embodiment of the present invention.

Figure 1:
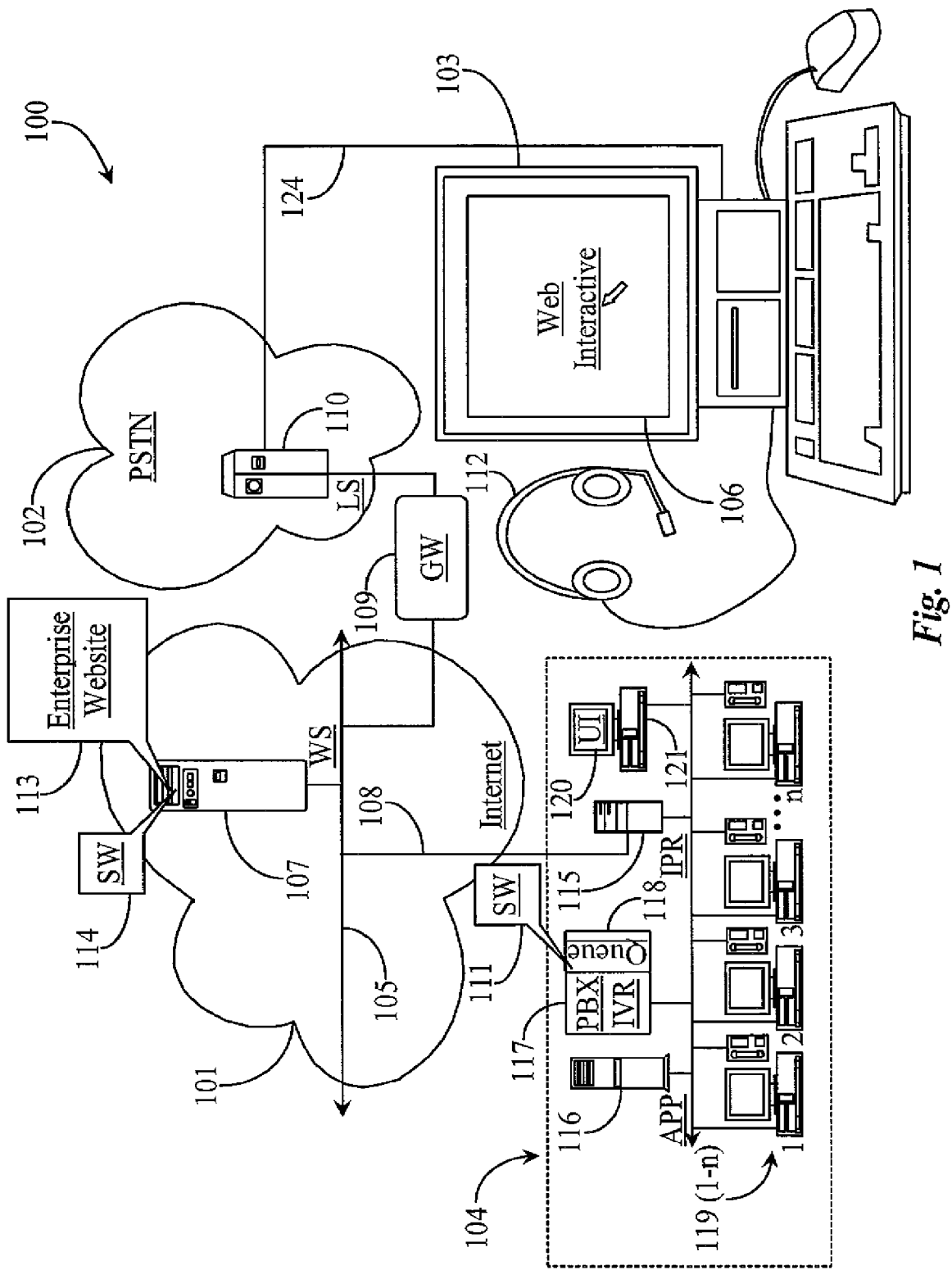
FIG. 1 is an architectural view of an enterprise communications network practicing interaction management according to an embodiment of the present invention.

FIG. 1 is an architectural view of an enterprise communications network 100 practicing interaction management according to an embodiment of the present invention. Communications network 100 includes the well-known Internet network 101, also referred to as the World Wide Web (WWW). Internet 101 is further represented by a network backbone 105, which represents all of the lines, equipment, and access points that make up the Internet network as a whole including connected sub-networks. Therefore, there are no geographic limitations to the practice of the present invention.

An enterprise call center (CC) 104 is illustrated in this example. CC 104 may be any enterprise equipped to process a large influx of incoming interactions. CC 104 includes a local area network (LAN) 126 that is adapted with Internet protocols like transfer control protocol over Internet protocol (TCP/IP) and other protocols required to include LAN 126 as a connected sub-network of Internet 101.

LAN 126 supports an Internet protocol router (IPR) 115. IPR 115 represents any logical gateway or router connecting LAN 126 to Internet network 101. IPR 115 is connected to Internet backbone 126 via an Internet access line 108. A Web server (WS) 107 is illustrated in this example and represents any server capable of serving electronic information pages to clients. Enterprise CC 104 maintains an enterprise Website 113 hosted on Web server 107. Website 113 represents a collection of electronic information pages that are accessed by potential customers and existing customers for the purpose of contacting the enterprise and engaging in business with the enterprise. WS 107 has a digital medium (not illustrated) coupled thereto that includes all of the data and software required to enable server function as a Web server.

WS 107 may be maintained on the Internet by enterprise 104 or by a third-party Web hosting service. In one embodiment WS 107 may reside on LAN 126 without departing from the spirit and scope of the invention. WS 107 may be accessed by potential clients or customers of enterprise 104 using Internet-capable appliances running Internet browser SW. A computing appliance 103 is illustrated in this example. Computing appliance 103 is a laptop computer in this example. In one embodiment, appliance 103 may be a personal digital assistant (PDA), a personal computer (PC), a smart phone, or any computing appliance that is enabled by browser, input mechanism, and display to navigate Website 113.

Computing appliance 103 includes a headset/microphone 112, which may be used in communications sessions using a telephony application (not illustrated) installed on and executable from computing appliance 103. In one embodiment computing appliance 103 is a smart telephone having an operating system, a graphical user interface, and telephony capability. In one embodiment computing station 103 comprises a computer and a separate telephone operating as a single communications station.

Computing appliance 103 has connection to Internet 101 through carrier network 102 by way of an Internet access line 124, a local telephony switch 110, and a network bridging facility or media gateway (GW) 109. An Internet service provider (ISP) is assumed present in this example although not illustrated. Other Internet connection methods may be used other that dial-up such as broad band, digital subscriber line (DSL), cable/modem, etc. A user operating computing appliance 103 is capable of practicing telephony and browsing a Website online simultaneously. In a scenario where a separate telephone is associated with computing appliance 103 instead of headset 112, the user may browse the Internet using appliance 103 and may engage in telephony using the associated telephone. The Website data channel and the telephone data channel may be carried over single or separate lines without departing from the spirit and scope of the present invention. In one embodiment computing appliance 103 connects wirelessly to the Internet through a satellite or other wireless data network system.

In this example, call center 104 maintains Website 113 on WS 107. The center has a "call us" radio button (not illustrated) embedded on at least one page of the Website such as a contact page of the Website. A user browsing the page containing the "call us" button may click on the option to initiate a telephony call to call center 104. A user may automatically connect to call center 104 using the "call us" button where the user's telephony application is combined with the browser capability on the same computing appliance. In another embodiment, a user may click on "call us" and see a telephone number to call whereupon the user may physically dial the number using a separate communications device. In still another embodiment, a user may accept a call from call center 104 to a designated device or application. What is evident in all of these scenarios is that the user is communicating with call center 104 using voice and browsing the Website of the center simultaneously.

Call center 104 may initiate a sales campaign that includes "all interactions generated from the Website requesting live assistance". A group of agents may be assigned to handle these interactions leaving direct incoming telephone calls sourced from other networks to other call center agents. The interactions may be limited to voice interactions, or they may include one-on-one chat interaction requests in the mix.

A plurality of agent stations 119 (1-n) is illustrated within call center 104 where each station has connection to LAN 126. An agent group may be defined as the group of agents operating stations 119(1-n). Agent stations 119 (1-n) are characterized by LAN connected PCs and associated LAN connected telephones. In this case, the telephones may be PBX IP telephones connected to a private branch exchange (PBX) soft switch 117, which is in turn connected to LAN 126. PBX 117 has IVR capability. An electronic queuing system 118 is provided and is associated with PBX/IVR 117. Users browsing Website 113 may click on "contact us" to initiate a voice call into center 104 from their computing appliance. The calls generated from Website 113 arrive at CC 104 at PBX/IVR 117. Each call may be intercepted by IVR and then routed to one of agent stations 119 (1-n).

When there are no agents available to take recently arrived calls, calls are placed in queuing system 118 to wait for the next available agent to take the call. Queuing system 118 may include one or more physical queues for representing callers that are waiting for a live agent. Queuing system 118 may be a multimedia queuing system so it may include queue space for voice requests (calls) and for chat requests (text-based live interaction). Queuing system 118 may include priority ordering with respect to queued entries. Queuing system 118 has software (SW) 111 installed thereon and executable there from. SW 111 is a queue manager application that is capable of changing the order in which queue entries are listed based on instruction. Such changes may be the result of analysis of data collected about the browsing behavior of the callers in queue whom are still connected to Website 113.

LAN 126 supports an administration PC 121 for monitoring Website 113 hosted on Web server 107. PC 121 has a user interface (UI) 120 open thereon that enables an authorized user such as a Website administrator to monitor Website data from Website 113 both automatically and manually. UI 120 enables, for example, an administrator to see who is visiting the Website including those who have initiated a live interaction while browsing the site. WS 107 includes SW 114 adapted to server a unique Web interactive to Web visitors such as Web interactive 106 illustrated on computing appliance 103. Web interactive 106 is served only to users who have clicked the "call us" option on Website 113 resulting in a queued interaction request in queuing system 118. UI 120 may be used to invoke SW 114 resident on WS 107. In one embodiment, SW 114 may reside on PC 121 instead of WS 107 and may be integrated with UI 120.

Web interactive 106 may be a packaged subset of pages taken from Website 113. Web interactive 106 may be one or more dynamically generated Web pages that are not associated with Website 113. Web interactive 106 may be a collection of third-party advertisement pages provided to CC 104 for inclusion into Web interactives served to users browsing the site while waiting in queue 118. A user may be redirected from the main Website to Web interactive 106 when the user clicks on "call us" to initiate a live interaction request at a period when there are not sufficient agents to engage callers and EWT in queue is longer than a preset threshold for serving the interactive content. In one embodiment the Web interactive may be served as a mini Website within Website 113 where users may interact and navigate with a possible goal of being advanced in queue.

Web interactive 106 may be a dynamically generated group of Web pages offered to a user to interact with who is in queue where the user's interaction with those pages is monitored and analyzed for the purpose of potentially modifying (advancing or retarding) the position of the user in queue relative to other users in the same queue. SW 114 may include session monitoring and data analysis software working according to one or more business rules designed to qualify a user for advancement in queue based on intent, emotion, click activity, pages visited, etc. While a user operating computing appliance 103 and headset 112 is in queue 118, that user may be browsing or otherwise interacting with Web interactive 106 and may be listening to background music on headset 112 from the IVR unit at PBX 117. IVR capability may include serving special applications to potential customers in queue 118, the applications supported by application server 116 connected to LAN 126. The browsing or interaction behavior of the user relative to Web interactive 106 is collected in real time and analyzed against one or more business rules to determine if the user will be advanced in queue or retained in queue (purposely delayed from live pickup of the call).

In one example, Web interactive 106 is a collection of third party advertisement pages dynamically served to a user based on what may already be known about the user. The user may advance position in queue by clicking on any of the advertised products with the intent of purchasing those products or finding out more about those products. In this case, clicks are priced and third party advertisers pay CC 104 for the ad space and click activity.

Web interactive may also include music, video, interactive games, puzzles, opinion solicitation, online polls, voting interfaces, or the like. Interaction with Web interactive 106 provides CC 104 with additional knowledge about a user in queue 118. Such knowledge might be leveraged to advance the user in queue, retard the user in queue, switch the user from one queue to another queue, redirect the user to another voice destination, or transfer the user to some automated service.

The structure of Web interactive 106 allows the user to gain position in queue in exchange for favorable acts or intents. For example, if a user called in to learn more about a product and was placed in queue, the Web interactive might display one or more pages relative to one or more versions of the product including similar products to help the user hone in on which product version might be purchased when a live agent answers. A user that successfully configures the desired version of the product and/or service might then be advanced to the front of the queue so an agent may assist the user with purchase of the product or service. Another user may not interact with Web interactive while in queue or may interact, but may make selections regarded as negative from the perspective of CC 104. Such a user may be held in queue for a longer period or may be redirected or transferred out to another service location.

In one embodiment, a user in queue 118 and interacting with Web interactive 103 may be able to make one or more purchases through the interactive while waiting in queue. If monitoring indicates that the user is in the middle of a purchase while waiting in queue, that user may be skipped over if an agent becomes ready because the CC does not want to interrupt a purchase in progress. More detail about the relationship between Web interactive 103 and CC queuing system 118 is provided further below.

Figure 2:
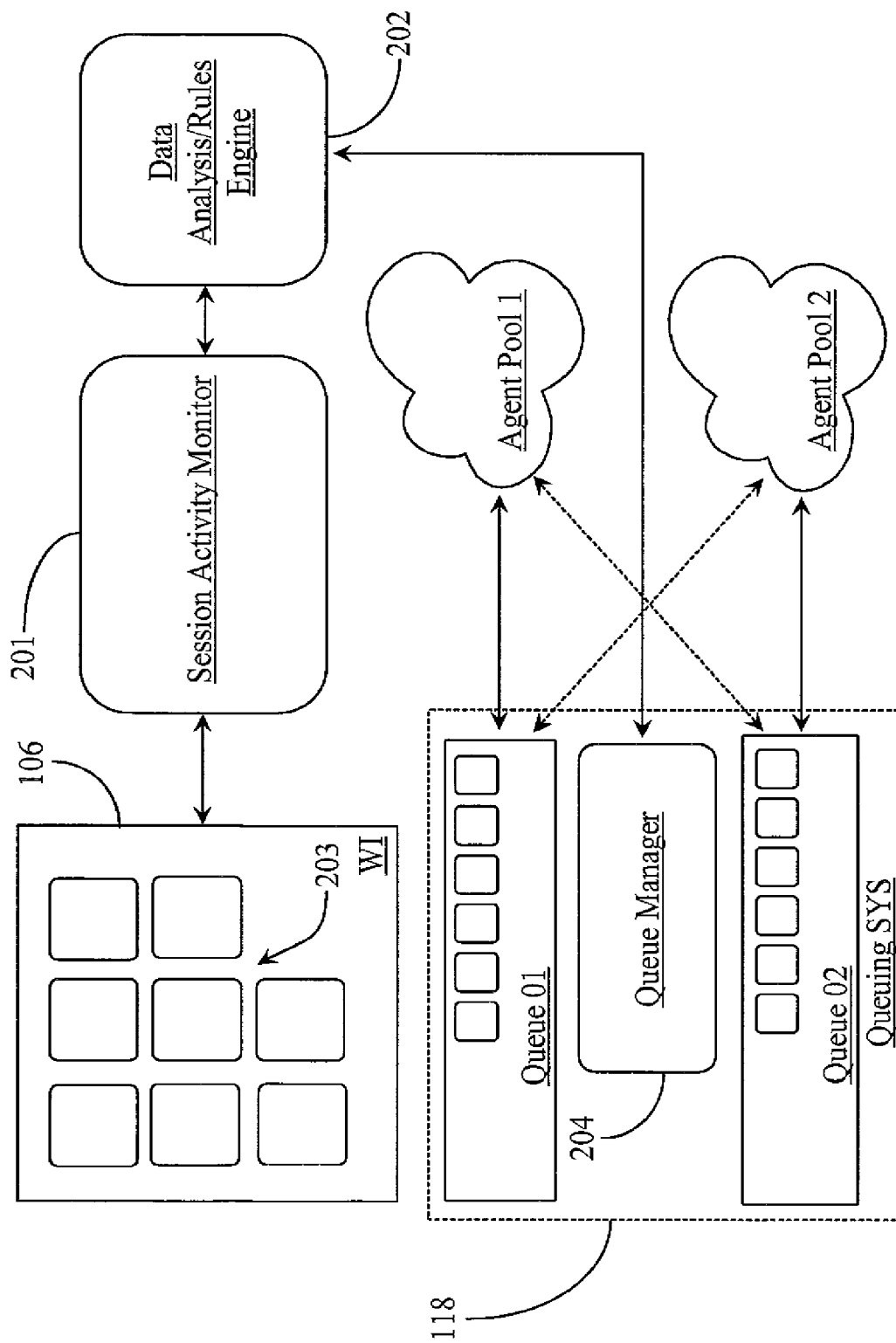
FIG. 2 is a block diagram illustrating correlation between a Web interactive and a multi-modal queuing system according to an embodiment of the present invention.

FIG. 2 is a block diagram illustrating correlation between a Web interactive and a multi-modal queuing system according to an embodiment of the present invention. Queuing system 118 includes two queues in this example, a queue 01 and a queue 02.

Queuing system 118 may contain a single queue or many queues without departing from the spirit and scope of the present invention. Queuing system 118 includes a queue manager application 204 that may be analogous to SW 111 illustrated and described in FIG. 1 above. Queue manager 204 manages queue 01 and queue 02 according to one or more business rules and general rules. For example, queue manager 204 may advance or retard any queue entry of which 6 queue entries are illustrated in each queue. Queue 01 and queue 02 contain sufficient memory for queuing entries in an enterprise environment where there may be hundreds of callers attempting to make contact through the Website resulting in queued entries in either or both queues. The only difference between queue 01 and queue 02 may be the purpose or intent of the queue. For example, queue 01 may contain queue entries representing callers waiting for live voice assistance and queue 02 may be a queue for entries requesting live chat assistance. Queue assignments may be varied according to products and services offered.

Web interactive (WI) 106 is tied to queuing system 118 through a session activity monitor 201, a data analysis and rules engine 202, and queue manager 204. When a user clicks on a "call us" button, that user is represented on one of queues 01 or 02 as waiting for live assistance. If there are live agents waiting to take interactions, the user might be immediately connected to a live agent without spending any time in queue. However, if there are currently no live agents available such as at a peak period of activity, then the call or interaction request is represented in one of the queues.

A time threshold might be established where EWT in queue is at or past the threshold indicating that the user will have sufficient time to interact with a Web interactive. In situations where the wait for a live agent is very short, perhaps 1 minute or under, there is no real need to serve an interactive to the user represented in queue. However, if EWT in queue is over say 3 minutes or more, then WI 106 is served. WI 106 contains a set of pages 203 in this example. Each page may be an HTML page tagged using a Java script methodology and code.

When the WI is served into the user's Web session, activity monitor 201 collects interaction data relative to the user's interaction with the served Web interactive. Activity monitor 201 may, in one embodiment, automatically forward the data to data analysis and rules engine 202 for the purpose of processing the data against one or more rules to determine a potential action. Queue manager 204 performs the required action on the target queue entry.

In this example there are two agent groups set up to handle interactions in queuing system 118. An agent pool 1 is directly responsible for answering calls from queue 01. An agent pool 2 is directly responsible for answering calls from queue 02. Agent pool 1 provides backup service to queue 02 and agent pool 2 provides backup service to queue 01. Using an earlier queue assignment example stated further above, agent pool 1 may be set up primarily to work voice calls from queue 01 but may lend a hand in text-based chat if they have to. Agent pool 2 is set up primarily to handle text-based chat requests but may provide voice backup to answer telephone calls queued in queue 01.

In one embodiment all of the components illustrated with exception of the agent pools may be provided in a single powerful server. In another embodiment they may be distributed components distributed to more than one machine. WI 106 may be one or a set of Web pages that a user is redirected to. In another embodiment WI is a sub-set of pages of the Website. In one embodiment WI 106 is a compilation of HTML advertisements provided by third-party sources.

In one embodiment and according to Web interaction data results obtained from session activity monitor 201 and processed by data analysis and rules engine 202 a queue entry in one of queues 01 or 02 may be de-queued from one queue serviced by one pool of agents and then queued into another queue serviced by another pool of agents. In such as case data analysis might uncover an intent that was not expressed by the user or known about the user when first queued. Interaction data acquired in real time while the user interacted with WI 106 may provide the fresh intent that resulted in the change of queues for the user.

In one embodiment WI 106 is a visual survey of questions that a user might be asked to fill out while in queue waiting for a live agent. The results of the survey might be processed in real time then weighed against the rules to determine if the entry should be advanced in queue. IVR interaction might be blended with Web interaction while the user is on hold waiting for a live agent. The IVR might be programmed to recognize specific hot words or other phrases the user might utter while in queue potentially leading to a change in queue position. There are many possibilities.

Figure 3:
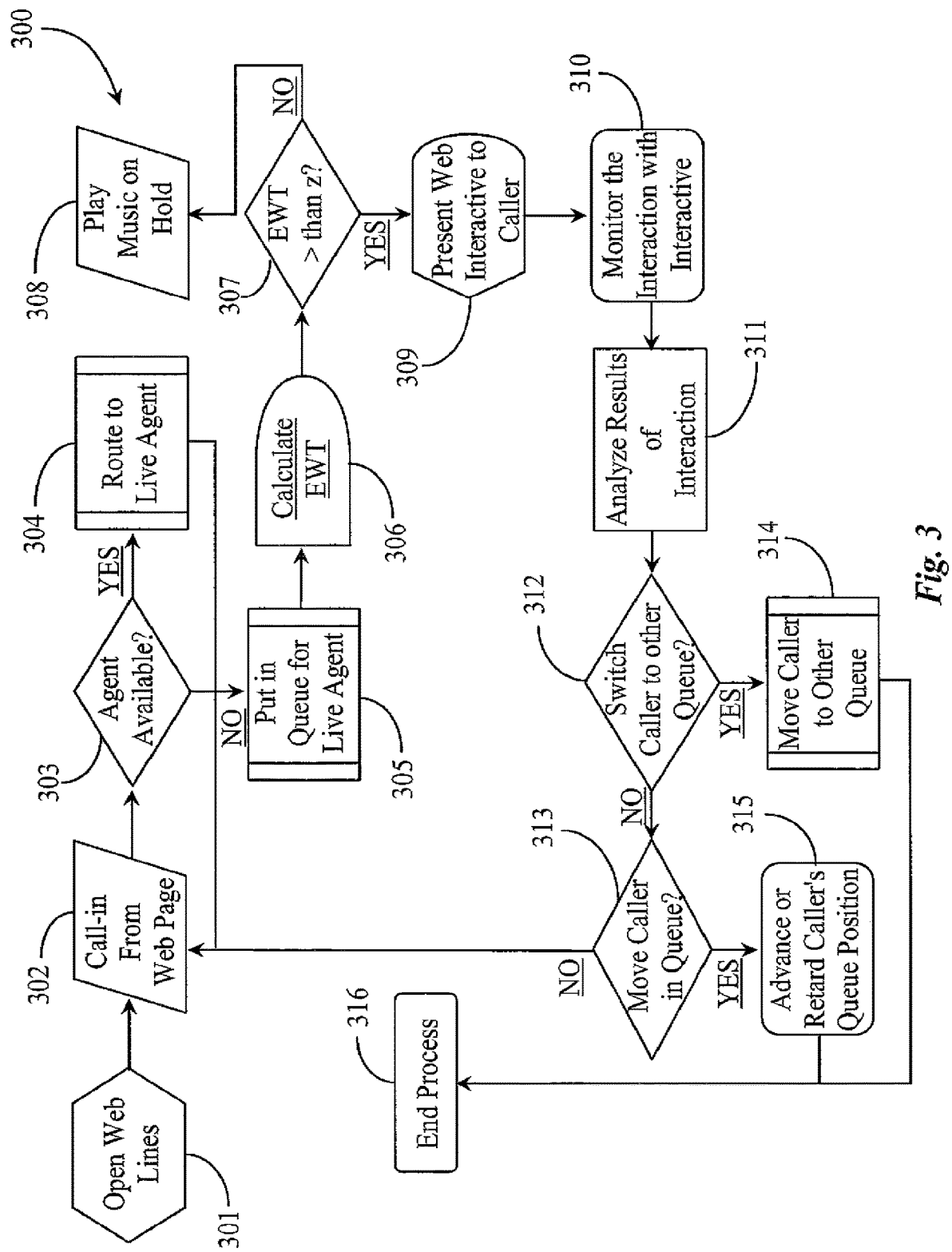
FIG. 3 is a process flow chart illustrating steps for adjusting queue position for a caller based on analysis of Web interaction according to an embodiment of the present invention.

FIG. 3 is a process flow chart 300 illustrating steps for adjusting queue position for a caller based on analysis of Web interaction according to an embodiment of the present invention. At step 301, the call center such as CC 104 of FIG. 1 opens Web lines for a live campaign. In this step, users will be enabled to click on a call and or chat request indicia embedded one or more pages on the enterprise Website. Web lines being open simply means that the options are enabled and agents are standing by to answer those interaction requests.

At step 302, a call or chat request arrives at a central switch from the Web page. In this example the calls and chat requests may be initiated through a session protocol like session initiation protocol (SIP) or another suitable protocol for setting up and tearing down network sessions. At step 303 the routing system associated with the campaign determines if there is an available agent to handle the interaction request. It is noted herein that in a universal digital queuing system call requests and chat requests may be queued together in the same queue space.

At step 303, if the routing system determines there is a ready agent to take the interaction, the interaction is routed to the next available live agent at step 304. In this case the request did not need to be queued. The process simply loops back to the next interaction received at the switch. If the routing system determines that there is not an available agent ready to take the interaction at step 303, the request is queued for a live agent at step 305. The system then calculates or otherwise determines the estimated waiting time (EWT) for that request to be serviced by a live agent. CC statistics may be leveraged to determine the current EWT.

At step 307 the system determines if the EWT for that request exceeds a preset threshold z. If the EWT is not longer than a preset threshold, then the system may play music on hold at step 308 during the time that the current request has in queue. In this case no Web interactive was served because the time to wait for an available agent is too short. The request is queued but no interactive content is served into the user's Web session. It is noted herein that if a user initiates contact through the Website then association between the users voice/chat session and Web browsing session is automatically made and is sometimes the same session where browsing and voice are enabled from a same computing device.

If a user makes a call using a separate telephone after seeing the number associated with the contact button, then the system will attempt to associate the call during IVR interception to an open Web session. If not enough information is available, then the IVR may prompt the user with the question "Are you currently on our Website?"

If the EWT is greater than z at step 309 then a Web interactive is presented (served) to the open Web session of the caller at step 309. The Web interactive may be part of the Website or it may be held in a different server connected to the host WS. In this example the term caller represents a user connected to the enterprise Website that initiated a voice call or a chat request through the site or by separate appliance while still connected to the Website. The Web interactive may be served to the caller as a mini set of pages visible in a mini browser window which may be expanded over the existing Web display at the user's appliance. The caller might be automatically redirected to the Web interactive held in another location in the same or a different server. In one case, a Web interactive might be dynamically generated for the caller and may include one or more navigable Web pages.

It is expected that the caller will interact with the Web interactive when it is served to the caller. However, it is possible that the caller will not interact with the served content and may just elect to wait in queue for the live assistance. In this case no interaction is detected and the caller may wait in queue the maximum duration. It is noted that interactive results between callers in queue might be compared in order to determine who gets to be served by the next available agent. The incentive to interact may be to advance one's position in queue shortening the wait for an agent. Another incentive might be that the caller that interacts with the interactive triggers free upgrades, product discounts, rewards, or other benefits like free technical service. Information gleaned from analyzing caller interaction with the Web interactive may be used to fine tune the campaign and the interactive content included in the Web interactive.

At step 310, the system monitors the caller interaction with the Web interactive such as recording mouse movements including clicks and mouseovers, noting specific pages accessed through tag data, and identifying any advertisements clicked on or any forms populated, and so on. The exact structure of the Web interactive may vary widely but will generally be tuned to the nature of the enterprise business model in terms of products, services, questions, surveys, and so on. In one embodiment the Web interactive is pure entertainment to engage the caller while the caller waits in queue. Perhaps the Web interactive is a two or three dimensional game that a gaming company wants to expose to the callers and get feedback about how the callers play the game or react to certain aspects of the game. Advancement in queue may come to those callers that are more proficient in game play of the game.

At step 311 the system analyzes the interaction results of the caller with the Web interactive. The results may be weighed against one or more business rules created for the purpose. At step 312 the system may make a decision in a case of more than one separate queue space, whether to switch the caller from one queue to another queue. If at step 312 the system decides not to move the caller between available queues, the system may decide based on the results of step 311 if the caller should be moved in the same queue with respect to position in queue relative to other callers in the same queue. If at step 313 the system determines not to move the position of the caller in queue, the process loops back to step 302 for processing the next call (interaction request).

Back at step 312, if the system determines to switch the caller from one queue to another queue based on results of step 311, then the queue manager may move the caller from one queue to the designated queue at step 314. After moving a queue entry from one queue to another, the process may end for that caller at step 316. It is noted that there may be a rule in place that prevents the queue manager from moving an entry from a low EWT position in the first queue to a higher EWT position in the second queue. In one embodiment if an entry is deposited into a new queue, then the process moves back to 303 where the system checks to see if an agent is available for that queue position before creating the queue entry in the new queue. The process may move on again for that caller and a new Web interactive might be served if the EWT in the new position in the new queue is greater than z.

In order to prevent an interaction from looping through the queuing system a rule might be created to prevent any one caller from waiting more than a certain period of time if transferred from one queue to another queue. For example, the caller may be automatically moved up in position in the second queue relative to the amount of time that the caller had to spend in the first queue before transfer. If at step 313 the system decided to move the caller's position in queue, at step 315 the queue manager may advance or retard the caller's position in queue. There may be a maximum limit a caller may spend in queue if that caller has been continually bumped down in position by other entries advancing in queue. In this embodiment when the caller has reached the maximum position a reserve pool of agents may be provided to handle the interaction if there are still no primary agents to handle the call. In another embodiment callers waiting past a certain period in queue may be prompted by IVR to accept a call back.

In a case where the Web interactive offers one or more transaction opportunities, the queue manager may delay advancement in the queue position of a caller if that caller is in the process of completing a transaction with the enterprise or advertised product through the Web interactive. In this case a rule might be created that specifies if a caller is passed up due to engagement in a transaction, that caller shall be re-queued at the top position in queue. The process typically ends for that caller at step 316.

It will be apparent to one with skill in the art that the electronic queuing system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A communication transaction management system for a contact center, comprising:
a processor; and
a memory, wherein the memory has stored thereon instructions that, when executed by the processor, cause the processor to:
receive an interaction to be routed to a contact center resource, the interaction being associated with an end user;
estimate a wait time for the interaction to be routed;
compare the estimated wait time to a threshold value;
in response to determining that the estimated wait time is greater than the threshold value:
provide an interactive presentation to the end user while the interaction is waiting to be routed;
monitor in real time, behavior of the end user in response to the interactive presentation while the interaction is waiting to be routed;
determine that the behavior is associated with a positive outcome for the contact center;
increase priority of the interaction based on the determining that the behavior is associated with the positive outcome, wherein the instructions that cause the processor to increase the priority include instructions that cause the processor to advance a position of the interaction in the wait queue; and
route the interaction to the contact center resource based on the advanced position in the wait queue;
wherein the interactive presentation is a web page, and the behavior of the end user involves the end user's interaction with the web page; and
wherein:
the behavior associated with the positive outcome for the contact center comprises the end user configuring a version of a product or service offered for sale on the web page; and
the positive outcome for the contact center comprises a sale of the version of the product or service offered for sale on the web page.

2. The system of claim 1, wherein the instructions further cause the processor to determine if the end user initiated the interaction using a multi-modal device having web-browsing ability.

3. The system of claim 1, wherein the interaction is initiated from a web page hosted by an enterprise of the contact center resource.

4. The system of claim 3, wherein initiation of the interaction from the web page initiates linking to the interactive presentation.

5. The system of claim 2, wherein the instructions further cause the processor to query the end user associated with the interaction to determine whether the end user has web access, and if web access is available, directing the end user to the interactive presentation.

6. The system of claim 1, wherein the interactive presentation is a survey comprising a mechanism for the end user to respond to questions.

7. The system of claim 1, wherein the interactive presentation comprises interactive ability for the end user to order a product or service.

8. The system of claim 7, wherein during an ordering process of the product or service, connection to the contact center resource is delayed until the ordering process is completed, and wherein accomplishing the order for the product or service advances the interaction for connection to the contact center resource.

9. The system of claim 1, wherein the instructions further cause the processor to select the interactive presentation based on a characteristic of the end user.

10. A method associated with a contact center, comprising:
receiving, by a processor, an interaction to be routed to a contact center resource, the interaction being associated with an end user;
estimating, by the processor, a wait time for the interaction to be routed;
comparing, by the processor, the estimated wait time to a threshold value;
in response to determining that the estimated wait time is greater than the threshold value:
providing, by the processor, an interactive presentation to the end use while the interaction is waiting to be routed;
monitoring in real time, by the processor, behavior of the end user in response to the interactive presentation while the interaction is waiting to be routed;
determining, by the processor, that the behavior comprises positive behavior that is associated with a positive outcome for the contact center;
increasing, by the processor, priority of the interaction based on the determining that the behavior is associated with the positive outcome, wherein the increased priority advances a position of the interaction in the wait queue; and
routing, by a switch coupled to the processor, the interaction to the contact center resource based on the advanced position in the wait queue;
wherein the interactive presentation comprises a web page, and the behavior of the end user involves the end user's interaction with the web page; and
wherein:
the positive behavior comprises the end user configuring a version of a product or service offered for sale on the web page; and
the positive outcome for the contact center comprises a sale of the version of the product or service offered for sale on the web page.

11. The method of claim 10, further comprising determining, by the processor, if the end user associated with the interaction has initiated the interaction using a multi-modal device having web-browsing ability.

12. The method of claim 10, wherein the interaction is initiated from a web page hosted by an enterprise of the first and second contact center resources.

13. The method of claim 12, wherein the initiation of the interaction from the web page initiates linking to the interactive presentation.

14. The method of claim 11, further comprising querying, by the processor, the end user associated with the interaction to determine if the end user has web access, and if web access is available, directing the end user to the interactive presentation.

15. The method of claim 10, wherein the interactive presentation is a survey comprising a mechanism for the end user to respond to questions.

16. The method of claim 10, wherein the interactive presentation comprises interactive ability for the end user to order a product or service.

17. The method of claim 16, wherein during an ordering process of the product or service, connection to the contact center resource is delayed until the ordering process is completed, and wherein accomplishing the order for the product or service advances the interaction for connection to the contact center resource.

18. The method of claim 10, further comprising selecting, by the processor, the interactive presentation based on a characteristic of the end user.

\* \* \* \* \*